(12) United States Patent
Mulugeta et al.

(10) Patent No.: US 12,069,081 B1
(45) Date of Patent: Aug. 20, 2024

(54) SECURITY SYSTEMS AND METHODS FOR DETECTING MALLEABLE COMMAND AND CONTROL

(71) Applicant: Netskope, Inc., Santa Clara, CA (US)

(72) Inventors: Dagmawi Mulugeta, London (GB); Wu-Sheng Lin, Taoyuan (TW); Colin Davidson Estep, Vienna, VA (US); Raymond Jospeh Canzanese, Jr., Philadelphia, PA (US); Yong Zheng, Santa Clara, CA (US); Haoxin Hu, San Jose, CA (US); Yongxing Wang, San Ramon, CA (US); Siying Yang, Saratoga, CA (US)

(73) Assignee: Netskope, Inc., Santa Clara, CA (US)

( * ) Notice: Subject to any disclaimer, the term of this patent is extended or adjusted under 35 U.S.C. 154(b) by 0 days.

(21) Appl. No.: 18/398,669

(22) Filed: Dec. 28, 2023

(51) Int. Cl.
*H04L 9/40* (2022.01)

(52) U.S. Cl.
CPC ...... *H04L 63/1425* (2013.01); *H04L 63/0245* (2013.01); *H04L 63/102* (2013.01); *H04L 63/1433* (2013.01)

(58) Field of Classification Search
CPC ............ H04L 63/1425; H04L 63/0245; H04L 63/102; H04L 63/1433
See application file for complete search history.

(56) References Cited

U.S. PATENT DOCUMENTS

| | | | |
|---|---|---|---|
| 2016/0072847 A1* | 3/2016 | Bremen | G06F 21/305 726/1 |
| 2019/0349405 A1* | 11/2019 | Bengtson | H04L 63/0823 |

* cited by examiner

*Primary Examiner* — Khoi V Le

(57) ABSTRACT

Presented is a network security system (NSS) that reliably detects malleable C2 traffic. The NSS intercepts outgoing transactions from user devices associated with user accounts. The NSS filters out transactions to known benign servers and analyzes remaining transactions for indicators of malleable command and control (C2) including heuristic, anomalous, and pattern-based detections. The NSS lowers the user confidence score associated with the user account or the user device based on the severity and number of detected indicators for each impacted outgoing transaction. When the user confidence score decreases below a threshold, the NSS implements a restricted security protocol for future outgoing transactions. Based on the detected indications, the NSS can identify malleable C2 attacker servers and add them to a blacklist of destination servers to further identify infected user accounts and devices.

23 Claims, 8 Drawing Sheets

```
http-get {
    set uri "/jquery-3.3.1.min.js";
    set verb "GET";
    client {                                                                    305
        header "Accept" "text/html,application/xhtml+xml,application/    310
            xml;q=0.9,*/*;q=0.8";
        header "Host" "code.jquery.com";
        header "Referer" http://code.jquery.com/;
        header "Accept-Encoding" "gzip, deflate";
        metadata {                                                       315
            base64url;
            prepend "_cfduid*";
            prepend "Cookie";
        }
    }
    server {                                                                    320
        header "Server" "NetDNA-cache/2.2";
        header "Cache-Control" "max-age=0, no-cache";
        header "Pragma" "no-cache";
        header "Connection" "keep-alive";
        header "Content-Type" "application/javascript; charset=utf-8";
    }
}
```

FIG. 3A

Destination IP address = 247.18.32.115   355

```
GET / HTTP/1.1
  Host: code.jquery.com
  User-Agent: Chrome/51.0.2704.103
  Accept: text/html,application/xhtml+xml, application/xml;q=0.9,*/*;q=0.8"
  Referer: http://code.jquery.com/
  Accept-Encoding: gzip, deflate
  Connection: keep-alive
```
360

| | Name | Learning Days | Testing Days | True Positive Rate | False Positive (/user/week) |
|---|---|---|---|---|---|
| 1 | Unusual domain | 48 | 20 | 100% | 34.3 |
| 2 | Unusual user agent | 48 | 20 | 85% | 1.9 |
| 3 | Beaconing | 0 | 68 | 93% | 23.1 |
| 4 | Beaconing from unusual user agent | 3 | 65 | 93% | 15.8 |
| 5 | Beaconing to unusual domain | 3 | 65 | 93% | 4.3 |
| 6 | Beaconing from unusual user agent to unusual domain | 3 | 65 | 93% | 2 |
| 7 | Consecutive sessions of beaconing | 0 | 68 | 69% | 1.3 |
| 8 | Unusual payload fingerprint (JA3) | 48 | 20 | 83% | 57.7 |
| 9 | Known malicious payload fingerprint (JA3) | 0 | 68 | 57% | 0.1 |
| 10 | Certificate issued by free/inexpensive issuer | 0 | 68 | 5% | 44.4 |

FIG. 5

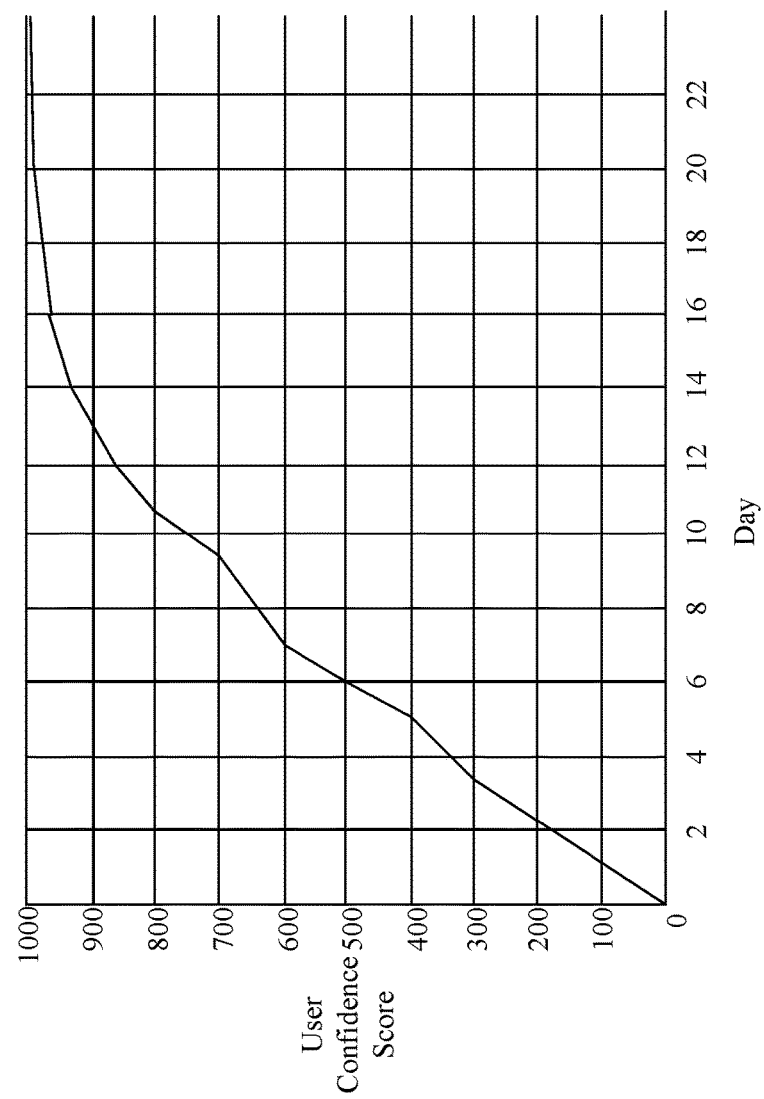

SECURITY SYSTEMS AND METHODS FOR DETECTING MALLEABLE COMMAND AND CONTROL

BACKGROUND

Malicious software (i.e., malware) executing on a victim's computer traditionally communicates with an attacker-controlled server to send information about the victim to the attacker and receive commands from the attacker. The network communication between the malware executing on the victim's computer and the attacker-controlled server is called "command and control," and is often abbreviated C2. Existing ways to detect malicious C2 include signatures and heuristics that detect patterns in known C2 traffic with attacker-controlled servers.

Recently, attackers have begun to use numerous tools that provide highly configurable settings for C2. This type of C2 is referred to as malleable C2. Some popular malleable C2 tools include COBALT STRIKE and MYTHIC. Malleable C2 allows attackers to configure many settings including frequency and jitter of beaconing, the structure of Uniform Resource Locators (URLs) to mimic legitimate services, and tough-to-detect content obfuscation. As a result, most signature and heuristic based detections cannot detect malleable C2. Manual detections are also of limited use and are time consuming. Accordingly, improvements for auto-detection of malleable C2 are needed.

SUMMARY

Methods, systems, and computer-readable memory devices storing instructions are described that detect malleable C2 for automatic remediation and protection. Malleable C2 is highly configurable and therefore difficult to detect. The present system intercepts outgoing transactions for security analysis. Transactions to known benign destination domain servers are filtered out to save processing resources. The remaining transactions are analyzed with a set of heuristic, anomalous, and pattern-based detections. These detections result in a user confidence score impact based on the severity and number of detections in each transaction associated with the user. When the user score falls below a threshold value, the system imposes a restricted security policy on future transactions. Further, the attacking server can be identified and blacklisted.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a computer-implemented method for detecting malleable command and control (C2). The computer-implemented method includes intercepting, by a network security system, outgoing transactions from a user account, where the outgoing transactions includes a header identifying a destination domain server. The network security system extracts the destination domain server from the header of each of the outgoing transactions and identifies a subset of the outgoing transactions based on the destination domain server. In other words, the network security system filters out transactions where the destination domain server is a known benign server. The network security system analyzes each outgoing transaction of the subset (i.e., not directed to a known benign domain server) of the outgoing transactions. The analyzing may include analyzing a payload fingerprint of the respective outgoing transaction, analyzing a user agent identified in the header of the respective outgoing transaction, and detecting whether the respective outgoing transaction indicates an anomalous pattern of communication by a user device from which the respective outgoing transaction originated. The network security system calculates a danger value based at least in part on anomalies associated with the payload fingerprint, anomalies associated with the user agent, and detected anomalous patterns. The network security system decreases the user confidence score associated with the user account based on the danger value of each outgoing transaction. When the user confidence score falls below a threshold value, the network security system applies a restricted security policy to future outgoing transactions from the user account, user device, or both. Other embodiments of this aspect include corresponding computer systems, apparatus, and computer programs recorded on one or more computer storage devices, each configured to perform the actions of the methods.

Implementations may include one or more of the following features. Optionally, the danger value increases based on the severity and number of the anomalies associated with the payload fingerprint, the anomalies associated with the user agent, and the detected anomalous patterns.

Optionally, analyzing the payload fingerprint may include determining whether the payload fingerprint is in a blacklist of payload fingerprints. Calculating the danger value may include increasing the danger value based on determining the payload fingerprint is in the blacklist of payload fingerprints.

Optionally, analyzing the payload fingerprint may include determining whether the payload fingerprint is in a baseline list of payload fingerprints associated with the user account. Calculating the danger value may include increasing the danger value based on determining the payload fingerprint is not in the baseline list of payload fingerprints.

Optionally, analyzing each outgoing transaction may further include analyzing a certificate of the respective outgoing transaction. Calculating the danger value may include increasing the danger value based on determining the certificate is issued by an issuer in a blacklist of issuers. The blacklist of issuers may include certificate issuers that are free or inexpensive services.

Optionally, analyzing each outgoing transaction may further include determining whether the destination domain server is included in a baseline list of destination domain servers for an organization associated with the user account. Calculating the danger value may include increasing the danger value based on determining the destination domain server is not included in the baseline list of destination domain servers. In other words, the destination domain server may be an unusual server for that enterprise.

Optionally, analyzing the user agent may include determining whether the user agent of the respective outgoing transaction is in a baseline list of user agents associated with the user account. Calculating the danger value may include increasing the danger value based on determining the user agent is not in the baseline list of user agents. In other words, the user agent may be an unusual user agent for that user account, user device, or both.

Optionally, analyzing the user agent may include determining whether the user agent of the respective outgoing transaction is in a baseline list of user agents associated with the user account. Further, analyzing each outgoing transaction may include determining whether the destination domain server is included in a baseline list of destination domain servers for an organization associated with the user account. Detecting whether the respective outgoing transaction indicates the anomalous pattern of communication may include detecting beaconing. Additionally, calculating the danger value may include increasing the danger value by a first amount based on detecting the beaconing; increasing the danger value by a second amount based on detecting the beaconing and determining the destination domain server is not included in the baseline list of destination domain servers; increasing the danger value by a third amount based on detecting the beaconing and determining the user agent is not in the baseline list of user agents; increasing the danger value by a fourth amount based on detecting the beaconing, determining the destination domain server is not included in the baseline list of destination domain servers, and determining the user agent is not in the baseline list of user agents; and increasing the danger value by a fifth amount based on detecting consecutive sessions of beaconing over a given time period.

Optionally, the restricted security policy may include blocking future outgoing transactions from the user account.

Optionally, the network security system may increase the user confidence score gradually over a healing time period.

Optionally, the network security system may identify a specific destination domain server as a malicious domain server based on analyzing the subset of outgoing transactions. The network security system can add the specific destination domain server to a blacklist of destination domain servers and identify other user accounts as infected based on comparing outgoing transactions from the other user accounts having a destination domain server in the blacklist.

Optionally, the outgoing transactions are hypertext transfer protocol (HTTP) or hypertext transfer protocol secure (HTTPS) transactions.

Optionally, identifying the subset of the outgoing transactions may include determining the destination domain server for each outgoing transaction of the subset of the outgoing transactions is not in a whitelist of known benign servers. Implementations of the described techniques may include hardware, a method or process, or computer software on a computer-accessible medium.

BRIEF DESCRIPTION OF THE DRAWINGS

In the drawings, like reference characters generally refer to like parts throughout the different views. Also, the drawings are not necessarily to scale, with an emphasis instead generally being placed upon illustrating the principles of the technology disclosed. In the following description, various implementations of the technology disclosed are described with reference to the following drawings.

FIG. 3A illustrates exemplary code included in malleable C2, according to some embodiments.

FIG. 3B illustrates portions and information in an exemplary outgoing transaction, according to some embodiments.

FIG. 5 illustrates exemplary testing data for detecting malleable C2, according to some embodiments.

FIG. 6 illustrates an exemplary graph of a user confidence score healing over a time period, according to some embodiments.

DETAILED DESCRIPTION

Figure 1:
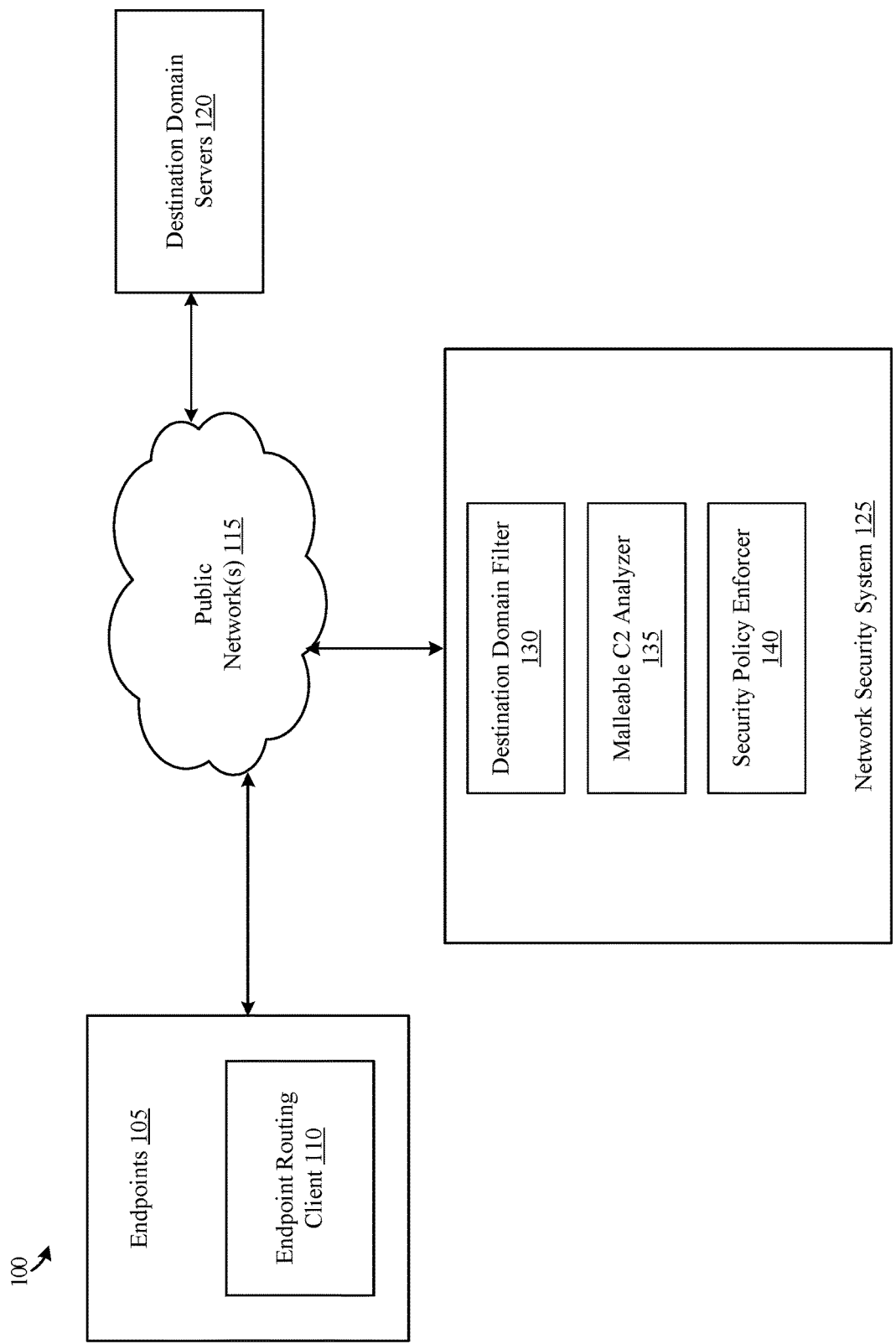
FIG. 1 illustrates a network security system that detects malleable C2, according to some embodiments.

Cyber security is an evolving field. As security improves, attackers (i.e., hackers) continuously find new vulnerabilities to exploit and new ways to infiltrate user devices and accounts on personal levels and at enterprise levels. Malleable C2 is one way attackers have evolved. Malleable C2 allows attackers to configure settings so that prior detection approaches no longer work reliably. Specifically, attackers control the attacking domain server, so the attacker can configure the settings in any way they wish. Accordingly, an infected computer may transmit malicious C2 transactions to the malleable C2 server with header information that looks benign, fooling security systems.

Existing ways to detect malicious C2 include signatures and heuristics that detect patterns in known C2 traffic with attacker-controlled servers. For example, existing solutions attempt to identify malleable C2 via threat intelligence (i.e., by blocking known-malicious domains and URLs) and by identifying patterns associated with known malicious C2 traffic (e.g., the URL contains known keywords). An intrusion prevention system (IPS) is traditionally used to match live network traffic with signatures of known C2 traffic. Endpoint detection and response (EDR) platforms can also identify potentially malicious C2 traffic by matching patterns of known malicious process execution and network communication. Since attackers can configure the settings associated with malleable C2, this type of detection is unreliable.

Disclosed herein is a network security system (NSS) that reliably detects malleable C2. The NSS intercepts the outgoing transactions from user devices associated with user accounts. The NSS filters out transactions to known benign destination domain servers. The NSS analyzes the remaining transactions to detect indications of malleable C2. For example, payload fingerprints may be calculated and compared to known malicious fingerprints. Further, baseline fingerprints for the given user may be compared to the fingerprint to identify anomalies. Additionally, the certificate issuer for certificates of the destination server may be compared with known free and inexpensive certificate issues since attackers do not typically invest in expensive certificates. Another detection may include comparing the user agent of the transaction with a baseline list of user agents used for the associated user account, user device, or both. A further detection may be noting that the destination domain server is unusual in that it is not in a baseline list of destination domain servers used by the enterprise the user account is associated with. Other detections may include identifying beaconing and the severity of such beaconing. For example, frequent beaconing, beaconing to an unusual destination domain server, beaconing from an unusual user agent, or any combination of such may indicate the severity of the beaconing. Based on the number of detections and severity of the detections, a user confidence score for the user (e.g., user device, user account, or both) can be decreased for each impacted outgoing transaction. Once the user confidence score drops below a threshold value, a restricted security policy can be implemented for the user. For example, the user may be restricted from accessing certain information, the user may be completely blocked from external transmissions, or any other restrictions may be placed on the user until the reason for the low score is identified.

Further, a destination domain server associated with sufficient questionable transactions can be added to an inspection list or a blacklist. If an inspection list is used, once inspected from the inspection list, the destination domain server can be identified as an attacker server and added to the blacklist. The blacklist can be used to quickly identify infected user devices or user accounts. For example, the destination domain server for the outgoing transactions can be compared with the blacklist. When an outgoing transaction includes a destination domain server in the blacklist, the user confidence score can be decreased below the threshold immediately to address the infection quicky (e.g., prevent further transactions from the infected device, trigger remediation of the infection, or the like). The NSS blocks outgoing transactions to blacklisted destination domain servers to avoid exfiltration of sensitive data.

Since malleable C2 is so configurable by the attacker, it cannot be reliably identified instantly based on a single transaction. Advantageously, the NSS is designed to impact the user confidence score sufficiently to quickly identify malleable C2 without allowing false positives to incorrectly create issues for users. The indicators are used collectively with appropriate severity levels to ensure that minor anomalies do not trigger malleable C2 identification. A score healing process is used to further ensure that minor anomalies or those that occur far apart in time do not create incorrect identification as well. Further, initial filtering of transactions to known benign servers saves processing power so that transactions that are known to not be malleable C2 are not analyzed. These processes improve network systems to increase infection detection quickly and reliably while allowing appropriate transactions to continue unimpacted. Using this malleable C2 detection saves human resources that may be needed to investigate and remediate infections and computing resources since malleable C2 infections are quickly and reliably identified and resolved.

Turning now to FIG. 1, it illustrates a high-level architecture of system 100. System 100 includes network security system 125 with the features for detecting malleable C2 as described throughout. System 100 includes endpoints 105, public networks 115, destination domain servers 120, and network security system 125.

Endpoints 105 comprise user devices including desktops, laptops, mobile devices, and the like. The mobile devices include smartphones, smart watches, and the like. Endpoints 105 may also include internet of things (IoT) devices. Endpoints 105 may include any number of components including those described with respect to computing device 700 of FIG. 7 including processors, output devices, communication interfaces, input devices, memory, and the like, all not depicted here for clarity. Endpoints 105 may include any number of endpoints, which may be used to access content (e.g., documents, images, and the like) stored in hosted services and other destination domain servers 120 and otherwise interact with servers and other devices connected to public network 115. Endpoints 105 include endpoint routing client 110. In some embodiments, endpoint routing client 110 may be a client installed on the endpoint 105. In other embodiments, endpoint routing client 110 may be implemented using a gateway that traffic from each endpoint 105 passes through for transmission out of a private or sub-network. While a single endpoint 105 is shown for simplicity, any number of endpoints 105 may be included in system 100. Further, multiple endpoints 105 associated each with one of a number of enterprises or clients of network security system 125 may be included.

Endpoint routing client 110 routes network traffic transmitted from its respective endpoint 105 to the network security system 125. Depending on the type of device for which endpoint routing client 110 is routing traffic, endpoint routing client 110 may use or be a virtual private network (VPN) such as VPN on demand or per-app-VPN that use certificate-based authentication. For example, for some devices having a first operating system, endpoint routing client 110 me be a per-app-VPN may be used or a set of domain-based VPN profiles may be used. For other devices having a second operating system, endpoint routing client 110 me be a cloud director mobile app. Endpoint routing client 110 can also be an agent that is downloaded using e-mail or silently installed using mass deployment tools.

Public network 115 may be any public network including, for example, the Internet. Public network 115 couples endpoints 105, destination domain servers 120, and network security system 125 such that any may communicate with any other via public network 115. While not depicted for simplicity, public network 115 may also couple many other devices for communication including, for example, other servers, other private networks, other user devices, and the like (e.g., any other connected devices). The communication path can be point-to-point over public network 115 and may include communication over private networks (not shown). In some embodiments, endpoint routing client 110, might be delivered indirectly, for example, via an application store (not shown). Communications can occur using a variety of network technologies, for example, private networks, Virtual Private Network (VPN), multiprotocol label switching (MPLS), local area network (LAN), wide area network (WAN), Public Switched Telephone Network (PSTN), Session Initiation Protocol (SIP), wireless networks, point-to-point networks, star network, token ring network, hub network, Internet, or the like. Communications may use a variety of protocols. Communications can use appropriate application programming interfaces (APIs) and data interchange formats, for example, Representational State Transfer (REST), JavaScript Object Notation (JSON), Extensible Markup Language (XML), Simple Object Access Protocol (SOAP), Java Message Service (JMS), Java Platform Module System, and the like. Additionally, a variety of authorization and authentication techniques, such as username/password, Open Authorization (OAuth), Kerberos, SecureID, digital certificates and more, can be used to secure communications.

Destination domain servers 120 include any domain servers available on public network 115. Destination domain servers 120 may include, for example, hosted services such as cloud computing and storage services, financial services, e-commerce services, or any type of applications, websites, or platforms that provide cloud-based storage or web services. Destination domain servers 120 may include known benign domain servers, unknown domain servers, and attacker servers, which are each described in more detail with respect to FIG. 2.

Network security system 125 may provide network security services to endpoints 105. Endpoint routing client 110 may route traffic from the endpoints 105 to network security system 125 to enforce security policies. While network security system 125 is shown as connected to endpoints 105 via public network 115, in some embodiments, network security system 125 may be on a private network with endpoints 105 to manage network security on premises. Network security system 125 may implement security management for endpoints 105. The security management may include protecting endpoints 105 from various security threats including data loss prevention (DLP) and other security vulnerabilities including detecting malleable command and control (C2). For simplicity, the features of network security system 125 related to detecting malleable C2 are shown while other security features are not described in detail. Network security system 125 may be implemented as a cloud-based service and accordingly may be served by one or more server computing systems that provide the cloud-based services that are distributed geographically across data centers, in some embodiments. Network security system 125 may be implemented in any computing system or architecture that can provide the described capabilities without departing from the scope of the present disclosure. Network security system 125 may include, among other security features, destination domain filter 130, malleable C2 analyzer 135, and security policy enforcer 140. While a single network security system 125 is depicted for simplicity, any number of network security systems 125 may be implemented in system 100 and may include multiple instances of destination domain filter 130, malleable C2 analyzer 135, and security policy enforcer 140 for handling multiple clients or enterprises on a per/client basis, for example.

Destination domain filter 130 filters outgoing transactions received from endpoints 105. After endpoint routing client 110 routes outgoing transactions to network security system 125, destination domain filter 130 extracts the destination domain from the header of the outgoing transaction. The destination domain indicated in the header may include an internet protocol (IP) address that resolves to a domain server in the destination domain servers 120. Destination domain filter 130 may compare the address of the domain server in the header to a whitelist of domain servers. The whitelist of domain servers may include known benign domain servers including, for example, popular domains (e.g., google.com, dropbox.com, slack.com, and the like), corporate owned domains for the relevant entity (e.g., <entity>.com), and other known benign domains. The whitelist may be maintained by the network security system 125, and destination domain filter 130 may compare the destination domain of the outgoing transaction to the whitelist. If the destination domain of the outgoing transaction is in the whitelist, destination domain filter 130 passes the outgoing transaction to security policy enforcer 140 for standard security policy enforcement on the outgoing transaction. If the destination domain of the outgoing transaction is not in the whitelist, the destination domain filter 130 passes the outgoing transaction to the malleable C2 analyzer 135 for analysis. In some embodiments, destination domain filter 130 may filter outgoing transactions that are not certain protocols such as hypertext transfer protocol (HTTP), hypertext transfer protocol secure (HTTPS), or domain name server (DNS) transactions. In some embodiments, malleable C2 analyzer 135 only analyzes DNS, HTTP, and HTTPS transactions, so any transactions that are not DNS, HTTP, and HTTPS are not sent to malleable C2 analyzer 135 and instead are passed to security policy enforcer 140 for enforcement of relevant security policies.

Malleable C2 analyzer 135 analyzes outgoing transactions that were passed by destination domain filter 130 to malleable C2 analyzer 135. Malleable C2 analyzer 135 analyzes the outgoing transactions to detect heuristics, anomalies, and patterns that may indicate malleable C2. For example, malleable C2 analyzer 135 analyzes the outgoing transactions to identify transactions that are being transmitted to known attacker domain servers. If the destination domain server of the outgoing transaction is to a known attacker domain server, a very high danger score may be assessed to the outgoing transaction, an administrator may be notified, and the outgoing transaction may be blocked. If the destination domain server of the outgoing transaction is not to a known attacker domain server, the outgoing transaction is further analyzed to detect indications of malleable C2. For example, a payload fingerprint of the transaction may be calculated and used to determine whether it is a known malicious fingerprint, whether the payload fingerprint is in a baseline of fingerprints for the associated user, or both. If it is known malicious or not in the baseline for the user, a danger score for the outgoing transaction may be increased. Other indicators may be further analyzed, and the danger score increased based on the indications related to heuristics, anomalies, and patterns as will be described in further detail with respect to FIG. 2. Once the danger score for the outgoing transaction is known, a user confidence score for the user is decreased based on the danger score (e.g., user confidence score is decreased by the value of the danger score). For example, if the danger score is very high, the user confidence score may be decreased a lot, and if the danger score is smaller, the user confidence score is decreased only a small amount. Once the user confidence score is calculated, security enforcement is applied by security policy enforcer 140. Additional details of malleable C2 analyzer 135 are described with respect to FIG. 2.

Security policy enforcer 140 enforces security policies on outgoing transactions intercepted by network security system 125 from endpoints 105. Security policy enforcer 140 may identify security policies to apply to outgoing transactions based on the user account or endpoint 105 (i.e., user device) that the outgoing transaction originates from. Further, security policies may be applied based on the destination domain server address, the type of transaction (e.g., change operation, sharing operation, creation operation, or the like of data or documents stored in cloud services), or other relevant criteria. Security policy enforcer 140 may identify relevant security policies for the outgoing transaction and apply the security policies. The security policies may include malleable C2 specific policies as well as any other security policies implemented by the organization or entity. Accordingly, security policy enforcer 140 may obtain the user confidence score for the user associated with an outgoing transaction to apply security policies based on the user confidence score or the destination server. For example, if the user confidence score is below a threshold value, security policy enforcer 140 may block future outgoing transactions from the associated user account with the low user confidence score. Security policy enforcer 140 may also block transactions directed to servers on a blacklist of known malleable C2 servers. Security policy enforcer 140 may also identify and enforce any other security policies (e.g., security policies other than those related to malleable C2). After applying the security policies, the outgoing transaction may be blocked, modified, or transmitted to the destination domain server 120 specified in the outgoing transaction.

In use, endpoint 105 generates an outgoing transaction to a destination domain server 120. Endpoint routing client 110 routes the outgoing transaction to network security system 125. Network security system 125 intercepts the outgoing transaction, and destination domain filter 130 determines whether the destination domain server 120 is in the whitelist of domain servers. If so, destination domain filter 130 passes the outgoing transaction to security policy enforcer 140.

Security policy enforcer 140 enforces security policies and either blocks the outgoing transaction or transmits it to the relevant destination domain server 120. If the destination domain filter 130 determines the destination domain server 120 specified in the outgoing transaction is not in the whitelist, it passes the outgoing transaction to malleable C2 analyzer 135. Malleable C2 analyzer 135 analyzes the outgoing transaction and modifies the user confidence score based on the analysis. Malleable C2 analyzer 135 passes the outgoing transaction to security policy enforcer 140. Security policy enforcer 140 enforces relevant security policies on the outgoing transaction and either blocks the transaction or transmits it to the relevant destination domain server 120. Security policy enforcer 140 uses the user confidence score that is modified by malleable C2 analyzer 135 to identify at least some of the relevant security policies to enforce on the outgoing transaction.

Figure 2:
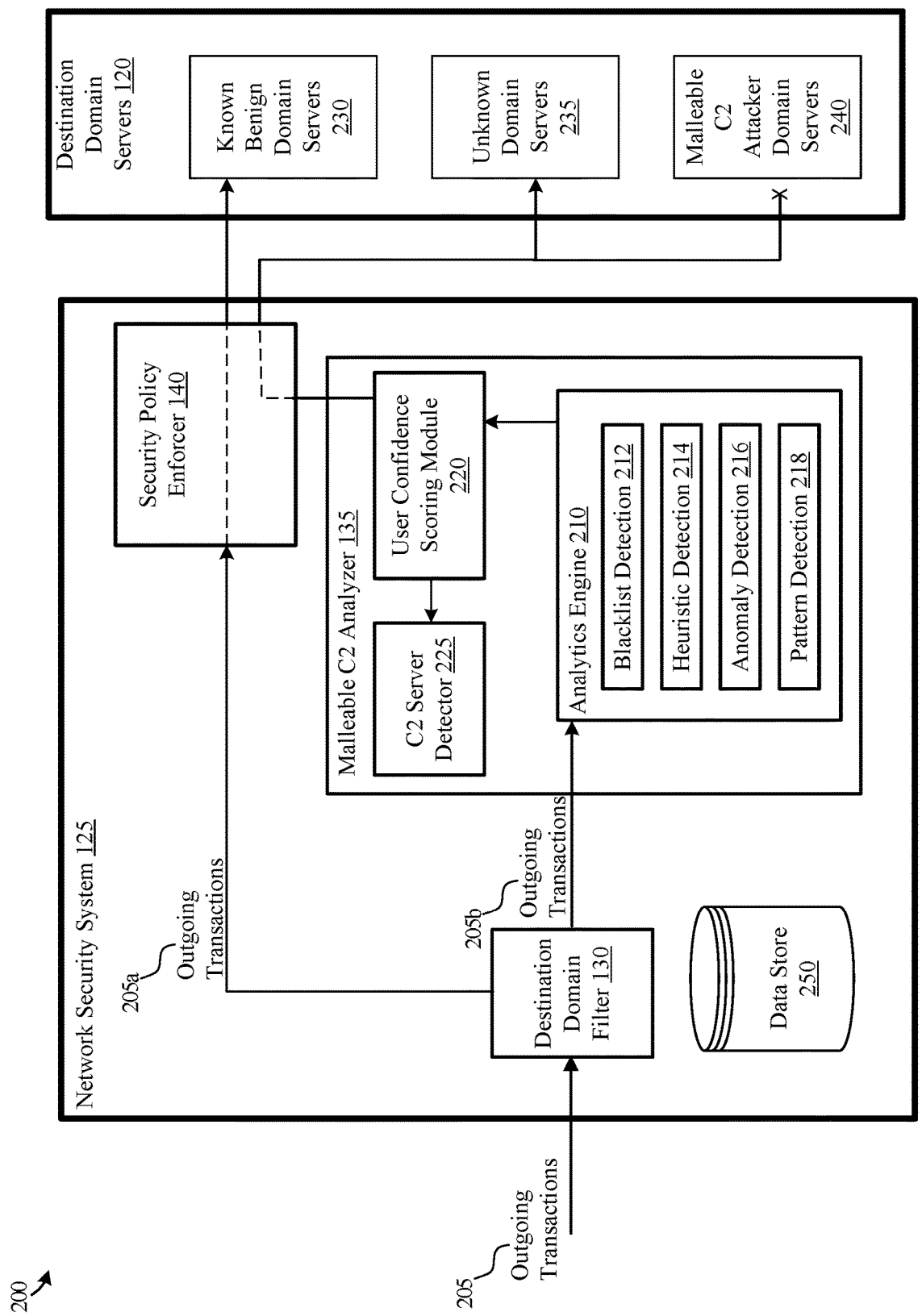
FIG. 2 illustrates additional details of the network security system, according to some embodiments.

FIG. 2 illustrates a block diagram to depict data flow 200 for outgoing transactions handled by system 100 and to provide further detail with respect to network security system 125 and particularly further detail with respect to malleable C2 analyzer 135. Data flow 200 includes various paths for outgoing transactions 205 through network security system 125 to destination domain servers 120. For simplicity and ease of visualization, public network 115 is not shown. However, data transmitted between network security system 125 to destination domain servers 120 is transmitted via public network 115.

Destination domain servers 120 are the same as those described with respect to FIG. 1. As shown in FIG. 2, destination domain servers 120 include known benign domain servers 230, unknown domain servers 235, and malleable C2 attacker domain servers 240.

Known benign domain servers 230 may be included on a whitelist of known benign servers. Known benign domain servers 230 may be collected based on top used domains that are publicly known and used, domains known as benign as owned by the corporation or entity for which security is provided, and other known benign domains as known by the network security system 125. For example, over time the network security system 125 may identify servers that are known to be safe. Further, cyber security personnel may edit the whitelist to include known benign domains.

Unknown domain servers 236 may include any destination domain servers 120 that are unknown to network security system 125. For example, any domain servers indicated in an outgoing transaction that the network security system 125 does not have listed in a whitelist of known benign servers or a blacklist of known malicious servers. Accordingly, the remaining destination domain servers 120 are unknown and fall within the unknown domain servers 235. Unknown domain servers 235 may include attacker servers that are not yet identified as well as benign servers.

Malleable C2 attacker domain servers 240 may be identified and listed in a blacklist of known malicious servers. Malleable C2 attacker domain servers 240 may be servers controlled by attackers and used to communicate with infected endpoints 105 using malleable C2.

Network security system 125 includes destination domain filter 130, malleable C2 analyzer 135, and security policy enforcer 140. Network security system 125 is described with respect to FIG. 1 and includes additional details here. Network security system 125 may include additional components and enforce other types of security, which is not described herein in detail for simplicity.

Destination domain filter 130 filters outgoing transactions 205 as described with respect to FIG. 1. Outgoing transactions are separated into two subsets. The first subset of outgoing transactions 205*a* are addressed to known benign destination domain servers 230. The second subset of outgoing transactions 205*b* are addressed to other domain servers (e.g., unknown domain servers 235 or malleable C2 attacker domain servers 240) than those in the benign whitelist that lists the known benign domain servers 230. In some embodiments, the first subset of outgoing transactions 205*a* are approximately ninety to ninety-five percent (90-95%) of all outgoing transactions 205, leaving only five to ten percent (5-10%) of all outgoing transactions 205 in the second subset of outgoing transactions 205*b*. Accordingly, destination domain filter 130 saves a lot of resources avoiding malleable C2 analysis of transactions that are known benign. In some embodiments, destination domain filter 130 or another filter prior to destination domain filter 130 may filter outgoing transactions 205 that are not HTTP or HTTPS transactions such that malleable C2 analyzer 135 only analyzes HTTP and HTTPS transactions.

Security policy enforcer 140 enforces security policies on outgoing transactions 205 that are forwarded from destination domain filter 130 (i.e., outgoing transactions 205*a*) and from malleable C2 analyzer 135 (i.e., outgoing transactions 205*b*). Security policy enforcer 140 may enforce security policies based on the type of transaction requested (e.g., share object, create object, modify object, delete object, and the like), the user associated with the transaction, the user device from which the request originated, and the like. In addition to general security policies, security policy enforcer 140 enforces malleable C2 specific policies for ensuring that transactions addressed to suspected or known malleable C2 attacker domain servers 240 are blocked and user accounts are restricted when they appear to be compromised. For example, security policy enforcer 140 may compare the destination of traffic against a blacklist of malleable C2 attacker domain servers 240. The blacklist may be obtained from data store 250, for example. If the destination of the traffic is in the blacklist, the transaction is blocked. Further, security policy enforcer 140 may select a security policy based on the user confidence score. For example, user confidence scores that fall below a threshold (e.g., 300) may trigger a restricted security policy. Security policy enforcer 140 may obtain the user confidence score from data store 250 to determine whether an outgoing transaction 205 is subject to a restricted policy based on a low user confidence score. A restricted policy may include blocking all future transactions from the user account, limiting access to certain resources, or the like. In some embodiments, multiple levels of restriction may be applied based on the user confidence score such that the lower the user confidence score, the more restricted the transactions are. For example, multiple thresholds may be used so at a first threshold (e.g., 500) the transactions are restricted to limit access to some resources, at a second threshold (e.g., 400) additional restrictions further limit access to additional resources, and at a third threshold (e.g., 300) all transactions are blocked. Depending on the results of security policy enforcer 140, the transaction may be transmitted to the destination domain server 120, blocked, or modified.

Malleable C2 analyzer 135 analyzes outgoing transactions 205*b* that are not addressed to known benign domain servers 230 for indications of malleable C2. Malleable C2 analyzer 135 includes analytics engine 210, user confidence scoring module 220, and C2 server detector 225. While specific elements are depicted for visualization, the features of malleable C2 analyzer 135 may be incorporated into network security system 125 with more or fewer modules to provide the described functionality without departing from the scope of the present disclosure.

Analytics engine 210 analyzes the outgoing transactions 205b. Many indications of malleable C2 may be identified, but since malleable C2 is so configurable by the attacker who owns and controls the malleable C2 attacker domain servers 240, it may take several outgoing transactions 205b to the attacker server before the malicious server can be identified and included in the malleable C2 attacker domain servers 240 for future outgoing transactions to be blocked. Since the settings used to identify a malleable C2 attacker domain server 240 can be configured to look benign, the detection of such attacks must be studied sufficiently to reliably identify an attack without blocking benign transactions due to false positives. To counteract the danger of false positive identification, a user confidence score is impacted by the analysis of each outgoing transaction. Indications in the outgoing transactions impact the score depending on severity, such that many transactions that have indications are used to accurately and reliably identify an infected user account or device.

Blacklist detection 212 analyzes the outgoing transactions 205b by comparing the destination domain server identified in the outgoing transaction 205b against the blacklist of malleable C2 attacker domain servers 240. The blacklist may be stored, for example, in data store 250 and used by security policy enforcer 140 as well. If an outgoing transaction 205b addressed to a destination domain server in the blacklist, the danger value of the outgoing transaction 205b is set very high (e.g., 1000 points) intended to ensure the user confidence score falls below the relevant threshold for implementing a restricted security policy. In some embodiments, the low user confidence score may trigger a notification that may trigger remediation for a known infection of the associated user account, user device, or both. Additional analytics are not likely needed, so the analytics engine 210 may output the outgoing transaction 205b with the danger value to user confidence scoring module 220 without further analysis in some embodiments.

Heuristic detection 214 analyzes the outgoing transactions 205b to find indications of malleable C2 based on empirical evidence. For example, outgoing transactions 205b may be encrypted using a transport layer security (TLS) certificate. TLS certificates are used to secure the outgoing transactions 205. There are several issuers of TLS certificates, and some are expensive while others are inexpensive or even free. Attackers are unlikely to spend large amounts of money on TLS certificates, so heuristic detection 214 may increase the danger value for outgoing transactions 205b that have TLS certificates issued by issuers that issue TLS certificates inexpensively or free. However, since those issuers also issue certificates to legitimate (i.e., benign) domain servers, this is only one indicator. Accordingly, heuristic detection 214 may increase the danger value of the outgoing transaction 205b only a small amount (e.g., 3 points) for a TLS certificate detection. Heuristic detection 214 may also calculate a payload fingerprint (e.g., JA3). For example, a JA3 fingerprint provides a near-unique value indicating the way a client application communicates over TLS. There are some known malicious payload fingerprint values, so the payload fingerprint can be compared against the list of known malicious values. If the payload fingerprint is found in the list of malicious values, the danger value for the outgoing transaction 205b can be increased. Furthermore, since a malicious fingerprint value is likely a problem, heuristic detection 214 may increase the danger value significantly for the outgoing transaction 205b based on this detection (e.g., 100 points).

Anomaly detection 216 analyzes the outgoing transactions 205b to find indications of malleable C2 based on anomalies identified over a baseline created during a learning period. These anomalies on their own are only a small indication of an issue, but many anomalies over time may indicate a malleable C2 infection. Anomaly detection 216 may identify unusual domains, unusual user agents, unusual payload fingerprints, or a combination thereof. To identify the anomalies, a learning period is used to baseline domains, user agents and payload fingerprints. For example, the learning period may be used to baseline the domains visited by the users of an enterprise. When an outgoing transaction 205b identifies a new destination domain that is not in the baseline, the danger value of the outgoing transaction 205b increases because the malleable C2 attacker domain server 240 is not likely to be in the baseline list. This anomaly is only a small indication and anomaly detection 216 will accordingly increase the danger value a small amount (e.g., 10 points). Anomaly detection 216 may also identify unusual user agents. The user agent is a value in a header of an HTTP and HTTPS transaction that indicates the product, version, and other information about the application that originated the transaction. However, the highly configurable nature of the malleable C2 may allow the attacker to attempt to fool security systems looking at the outgoing transactions 205b by spoofing the user agent to look legitimate. However, a spoofed user agent is likely to be different than a baseline of the user agents typically used by the user account and device. Accordingly, anomaly detection 216 may baseline user agents for the user accounts and devices during the learning period. When an outgoing transaction 205b includes a user agent that is not in the baseline list associated with the user account or device, anomaly detection 216 increases the danger value of the outgoing transaction 205b. However, this increase is also small (e.g., 10 points) since a new user agent may not be a big concern on its own. Anomaly detection 216 may identify unusual payload fingerprints (e.g., JA3). During the learning period malleable C2 analyzer 135 may baseline payload fingerprint values used by the user account or user device. Anomaly detection 216 may calculate the payload fingerprint for outgoing transaction 205b (or receive it from heuristic detection 214 if already calculated) and compare it to the baseline list of payload fingerprints for the user account or device. When an outgoing transaction 205b generates a new payload fingerprint that is not in the baseline list, anomaly detection 216 increases the danger value for the outgoing transaction 205b a small amount (e.g., 10 points).

Pattern detection 218 analyzes the outgoing transactions 205b to identify patterns in communication over time for the given user account or device. For example, pattern detection 218 may identify beaconing behavior, which is repeated communication from an application on a user device to a domain within a certain time period. For example, repeated communication that exceed a threshold number (e.g., forty-five) within a time period (e.g., an hour) are considered a pattern. The threshold number of communications and the time period may be adjusted over time as needed. Because beaconing behavior is not uncommon or necessarily malicious (e.g., operating systems and other applications may use beaconing to check their home server for updates) other information in addition to beaconing may be used to accordingly increase the danger value of the outgoing transaction 205b. For example, an outgoing transaction 205b that represents a beaconing behavior (e.g., exceeds the threshold number of communications within the time period) may be identified by pattern detection 218, and pattern detection 218 may increase the danger value of the outgoing transaction by a small amount (e.g., 10 points). Pattern detection 218 may further detect that the beaconing is from an unusual user agent for the associated user account or device based on the baselining of the user agent from anomaly detection 216. Pattern detection 218 may increase the danger value of the outgoing transaction by a larger amount based on the beaconing from the unusual user agent (e.g., 20 points). Pattern detection 218 may further detect that the beaconing is to an unusual domain based on the baselining of the domains from anomaly detection 216. Pattern detection 218 may increase the danger value of the outgoing transaction by a larger amount based on the beaconing to the unusual domain (e.g., 30 points). Pattern detection 218 may further detect that the beaconing is from an unusual user agent to an unusual domain based on the baselining of anomaly detection 216. When both an unusual user agent and an unusual domain are identified, both point values may be added so that the danger value increases by the total of both types of beaconing (e.g., 50 points). Pattern detection 218 may further detect that there are consecutive sessions of beaconing (e.g., three back-to-back hours). Consecutive sessions of beaconing may be detected by configuring a distance in time the recurrence falls within (every hour, every day, or the like) and the number of consecutive sessions (e.g., three), for example. Pattern detection 218 may increase the danger value by a relatively large value for consecutive sessions of beaconing (e.g., 75 points).

When all heuristics, anomalies, and patterns are detected and the danger value of the outgoing transaction 205b is determined, analytics engine 210 provides the outgoing transaction 205b and the danger value to the user confidence scoring module 220.

User confidence scoring module 220 modifies the user confidence score for the associated user of the outgoing transaction 205b based on the danger value from analytics engine 210. For example, a top user confidence score may be one thousand (1000). The user confidence score may be considered a score of how much risk the user poses. Any range of values may be used, and those provided here are exemplary only. A user has a healthy or good score when it falls between six hundred fifty-one (651) and one thousand (1000). A user has a moderate score when it falls between three hundred fifty-one (351) and six hundred fifty (650). A user has a poor score when it falls between zero (0) and three hundred fifty (350). A certain amount of the risk score may be transferred from one day to the next to allow the user confidence score to heal over time. This is discussed in more detail with respect to FIG. 6. The user confidence scoring module 220 reduces the user confidence score for the user based on the danger value of the outgoing transaction 205b. For example, the user confidence score may be eight hundred (800), and the danger value for the outgoing transaction 205b may be twenty (20). User confidence scoring module 220 may adjust the user confidence score to seven hundred eighty (780) based on outgoing transaction 205b. User confidence scoring module 220 may update the user confidence score for the user in data store 250. User confidence scoring module 220 may provide the outgoing transaction 205b to security policy enforcer 140 for security policy enforcement.

C2 server detector 225 may identify a destination domain server 120 as a suspected malleable C2 attacker domain server 240. For example, C2 server detector 225 may receive a notification when a user confidence score falls below a threshold value from user confidence scoring module 220. Upon such indication, C2 server detector 225 may analyze transactions associated with the user account to identify a suspect destination domain server 120. More specifically, C2 server detector 225 may analyze the outgoing transactions 205b that led to the user score falling and identify a suspect domain server associated with at least some of the outgoing transactions 205b. C2 server detector 225 may use an artificial intelligence (AI) model to identify the suspect domain server in some embodiments. Once detected, C2 server detector 225 may add the suspect domain server to a gray list for further review in some embodiments or directly to the blacklist in some embodiments.

Data store 250 may be any memory device used by network security system 125 for storing relevant data for enforcing security. For example, data store 250 may store security policies applied by security policy enforcer 140. Data store 250 may store user confidence scores for users. Data store 250 may store baseline information used by analytics engine 210. Data store 250 may store the whitelist of known benign domain servers 230 and the blacklist of malleable C2 attacker domain servers 240.

In use, outgoing transactions 205 are intercepted by network security system 125. Outgoing transactions 205 are processed by destination domain filter 130. Outgoing transactions 205a that are addressed to known benign domain servers 230 are sent to security policy enforcer 140. Security policy enforcer 140 identifies and applies relevant security policies to the outgoing transactions 205a and transmits the outgoing transactions 205a to the addressed known benign domain servers 230 or blocks them based on the security policies. Outgoing transactions 205b that are not addressed to known benign domain servers 230 are sent to malleable C2 analyzer 135. Analytics engine 210 uses blacklist detection 212, heuristic detection 214, anomaly detection 216, and pattern detection 218 to detect indicators of malleable C2 and assign a danger value (e.g., a danger score or risk score) to the outgoing transaction 205b and passes the danger value and associated outgoing transaction 205b to user confidence scoring module 220. User confidence scoring module 220 modifies the user confidence score for the associated user based on the danger value and passes the outgoing transaction 205b to security policy enforcer 140. Security policy enforcer 140 enforces C2 specific security policies as well as any other security policies implemented (e.g., standard security policies based on the user, transaction, or the like). For example, outgoing transactions 205b addressed to malleable C2 attacker domain servers 240 in the blacklist are blocked by security policy enforcer 140. Security policy enforcer 140 may incorporate a restricted security policy for the outgoing transaction 205b based on the new user confidence score if it falls below a threshold value. This may be configurable such that restrictions may increase as the user confidence score decreases below various thresholds. The restricted security policy may restrict access to certain sensitive data, block all outgoing transactions 205a and 205b for the user, or any other restrictions that are configured to be used by security policy enforcer 140. Security policy enforcer 140 either blocks the outgoing transaction 205b or transmits it to the relevant addressed unknown domain server 235 based on the applied security policies. Further, C2 server detector 225 may receive an indication from user confidence scoring module 220 when a user confidence score falls below a threshold value. C2 server detector 225 may identify suspected new malleable C2 attacker domain servers 240 and add them to the blacklist.

FIG. 3A illustrates exemplary malleable C2 code 300 that may be included to configure parameters that attempt to fool network security systems like network security system 125. Code 300 includes HTTP client code 305 that includes the client header designations 310 and client metadata designations 315. The server response header code 320 is also shown. Since the malleable C2 attacker domain server (e.g., malleable C2 attacker domain server 240) is owned and operated by the attacker, the client header designations 310 can indicate benign communications that are used frequently by known benign servers (e.g., known benign domain servers 230). For example, the host "code.jquery.com" may indicate benign behavior, but since the attacker server is controlled by the attacker, it may either ignore such header information or use it differently than is typical for benign behavior. Further, since such access is typical for benign behavior, blocking such transactions would block many benign transactions.

FIG. 3B illustrates an example outgoing transaction 205b1 generated from malleable C2 code 300 execution. Outgoing transaction 205b1 may be an internet protocol (IP) packet with a header that includes the destination IP address 355. Destination domain filter 130 can extract the destination IP address 355 from the header of the IP packet to compare the destination IP address to the whitelist of known benign domain servers 230. Within the payload of the IP packet is the HTTP packet including HTTP header 360. As shown, the HTTP header 360 may look benign having a user agent that does not appear to be a malicious application, a benign looking host and referrer, and the like. However, despite this benign looking header information, indications, such as the user agent falling outside a baseline list, an unusual payload fingerprint or known malicious payload fingerprint, a known malicious destination IP address, beaconing behavior, and the like are identified by malleable C2 analyzer 135 that increase detection of the malicious intent of such transactions over time.

Figure 4:
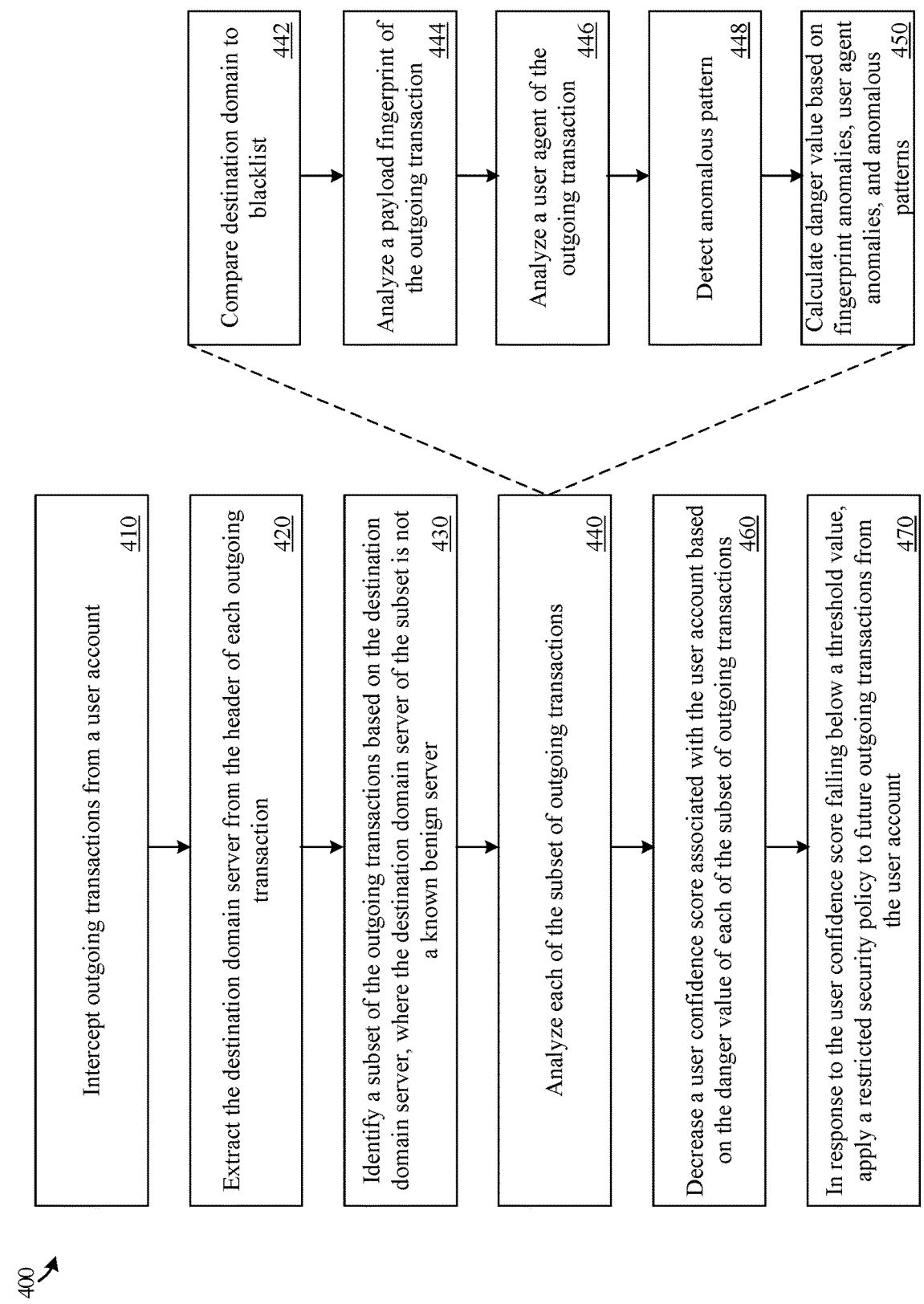
FIG. 4 illustrates a method for detecting malleable C2, according to some embodiments.

FIG. 4 illustrates a method 400 for detecting malleable C2. Method 400 may be implemented by network security system 125. Method 400 begins at 410 with network security system 125 intercepting outgoing transactions from a user account. For example, a user account being used on endpoint 105 may initiate an outgoing transaction 205, that is routed by endpoint routing client 110 to network security system 125.

At 420, network security system 125 extracts the destination domain server from the header of each outgoing transaction. For example, the destination IP address indicates the destination domain server to which the outgoing transaction is addressed. Destination domain filter 130 may extract the header information to determine the addressed domain server in the outgoing transaction. At 430, destination domain filter 130 identifies a subset of the outgoing transactions based on the destination domain server that are not addressed to a known benign server. For example, the whitelist of known benign domain servers 230 may include resolved domain names or IP addresses, and destination domain filter 130 may either use the extracted IP address or resolve the domain name and compare it to the whitelist to identify outgoing transactions addressed to known benign servers. The remaining outgoing transactions not addressed to known benign domain servers are identified in the subset (e.g., outgoing transactions 205b).

At 440, the subset of outgoing transactions are analyzed (e.g., by malleable C2 analyzer 135). For example, at 442, the destination domain of the outgoing transaction is compared to destination domains in a blacklist (e.g., by blacklist detection 212). If identified in the blacklist, the danger value of the outgoing transaction is set very high. At 444, the payload fingerprint of the outgoing transaction may be analyzed (e.g., by heuristic detection 214, anomaly detection 216, or both). For example, the payload fingerprint can be compared to known malicious payload fingerprints, compared to a baseline for the associated user or user device, or both. If the payload fingerprint is a known malicious payload fingerprint or if it is an unusual payload fingerprint for the user, the danger value may be increased. At 446 the user agent for the outgoing transaction may be analyzed (e.g., by anomaly detection 216). For example, the user agent may be compared to a baseline list of user agents for the user. If the user agent is unusual (e.g., not in the baseline list), the danger value for the outgoing transaction may be increased. At 448, anomalous patterns may be detected (e.g., by pattern detection 218). If beaconing behavior is identified, the danger value of the outgoing transaction may be increased. At 250, all the danger values for the detected indicators are combined to calculate a danger value for the outgoing transaction.

At 460, the user confidence score for each user is decreased based on the danger value of the outgoing transactions associated with the respective user. For example, user confidence scoring module 220 may adjust the user confidence score by subtracting the danger value of the outgoing transaction from the user confidence score and storing the adjusted value in the data store 250.

At 470, when the user confidence score falls below a threshold value, a restricted security policy is applied and enforced on future outgoing transactions from the user account. For example, security policy enforcer 140 may enforce a restricted policy on all outgoing transactions from a user account that has a user confidence score below, for example, three hundred fifty (350). The restricted policy may include blocking all future outgoing transactions including those to known benign domain servers. The restricted policy may include restricting access to sensitive data, certain cloud-based applications or services, or the like. In some embodiments, more extreme restrictions may be applied as the user confidence score falls below additional thresholds such that the lower the user confidence score, the more restrictive the security policy.

Additional optional steps to method 400 not depicted may include identifying a malicious C2 attacker domain server based on a history of outgoing transactions addressed to the domain server. For example, over time and over one or more user accounts, a malleable C2 attacker domain server may be identified based on a series of outgoing transactions.

FIG. 5 illustrates exemplary learning and testing information for indicators for detecting malleable C2. The goal of the indicators is to have a low learning period, low false positive rate, and high true positive rate. Accordingly, some indicators are more accurate than others. Higher accuracy indicators may help guide danger values to assign to the indicators identified for outgoing transactions.

The first row of the table provides exemplary information for identifying an unusual domain Outgoing transactions from all users for an enterprise are baselined during the forty-eight (48) learning days. Outgoing transactions are analyzed for twenty days thereafter, and during the testing days, the true positive rate is one hundred percent (100%), and the false positive rate is on average 34.3 false positives per user per week. Accordingly, unusual domain is a solid indicator, but the false positive rate is high, so the danger value must be low enough to avoid impacting a user confidence score too harshly to restrict access prematurely. The high false positive rate indicates that benign transactions may be incorrectly blocked if this indicator is given too much weight. Therefore, this indicator may be given a low value (e.g., 10 points).

The second row of the table provides exemplary information for identifying an unusual user agent. Outgoing transactions from each user for an enterprise are baselined during the forty-eight (48) learning days. Outgoing transactions are analyzed for twenty days thereafter, and during the testing days, the true positive rate is eighty-five percent (85%), and the false positive rate is on average 1.9 false positives per user per week. Accordingly, unusual user agent is a very good indicator. The true positive rate is fairly high, the false positive rate is quite low, and the learning period is not long. Therefore, this indicator may be given a moderate value (e.g., 25 points).

The third row of the table provides exemplary information for identifying beaconing. Beaconing is based on threshold time and repetition values, so learning is not needed and learning days is zero (0). For that reason, testing can begin immediately, and runs sixty-eight (68) days. Outgoing transactions are analyzed for the testing days, and the true positive rate is ninety-three percent (93%), and the false positive rate is on average 23.1 false positives per user per week. Accordingly, general beaconing is a moderate indicator. The true positive rate is high and there are no testing days, but the false positive rate is also high. Therefore, this indicator may be given a low value (e.g., 10 points).

The fourth row of the table provides exemplary information for identifying beaconing from an unusual user agent. Beaconing is based on threshold time and repetition values, so learning is not needed, but three days are needed to baseline the user agent for the users. For that reason, testing can begin immediately after the three learning days and runs sixty-five (65) days. Outgoing transactions are analyzed for the testing days, and the true positive rate is ninety-three percent (93%), and the false positive rate is on average 15.8 false positives per user per week. Accordingly, beaconing from an unusual user agent is a moderate indicator. The true positive rate is high and there are few testing days, but the false positive rate is also relatively high. Therefore, this indicator may be given a low value, but higher than general beaconing (e.g., 15 points).

The fifth row of the table provides exemplary information for identifying beaconing to an unusual domain Beaconing is based on threshold time and repetition values, so learning is not needed, but three days are needed to baseline the domains. For that reason, testing can begin immediately after the three learning days and runs sixty-five (65) days. Outgoing transactions are analyzed for the testing days, and the true positive rate is ninety-three percent (93%), and the false positive rate is on average 4.3 false positives per user per week. Accordingly, beaconing to an unusual domain is an accurate indicator. The true positive rate is high and there are few testing days, but the false positive rate is still higher than preferred. Therefore, this indicator may be given a moderate value (e.g., 20 points).

The sixth row of the table provides exemplary information for identifying beaconing from an unusual user agent to an unusual domain Beaconing is based on threshold time and repetition values, so learning is not needed, but three days are needed to baseline the domains and user agents. For that reason, testing can begin immediately after the three learning days and runs sixty-five (65) days. Outgoing transactions are analyzed for the testing days, and the true positive rate is ninety-three percent (93%), and the false positive rate is on average 2.0 false positives per user per week. Accordingly, beaconing to an unusual domain is a very good indicator. The true positive rate is high, there are few testing days, and the false positive rate is relatively low. Therefore, this indicator may be given a high value (e.g., 50 points).

The seventh row of the table provides exemplary information for identifying consecutive sessions of beaconing. Beaconing is based on threshold time and repetition values, so learning is not needed. For that reason, testing can begin immediately and runs sixty-eight (68) days. Outgoing transactions are analyzed for the testing days, and the true positive rate is sixty-nine percent (69%), and the false positive rate is on average 1.3 false positives per user per week. Accordingly, consecutive sessions of beaconing are a very good indicator. The true positive rate is relatively high, there are no testing days, and the false positive rate is low. Therefore, this indicator may be given a high value (e.g., 40 points).

The eighth row of the table provides exemplary information for identifying an unusual payload fingerprint. Outgoing transactions from each user for an enterprise are baselined during the forty-eight (48) learning days. Outgoing transactions are analyzed for twenty days thereafter, and during the testing days, the true positive rate is eighty-three percent (83%), and the false positive rate is on average 57.7 false positives per user per week. Accordingly, unusual user agent is a moderate indicator. The true positive rate is fairly high, but the false positive rate is high, and the learning period is moderate. Therefore, this indicator may be given a low value (e.g., 10 points).

The ninth row of the table provides exemplary information for identifying known malicious payload fingerprints. No learning is needed as known malicious payload fingerprints are known and published by security companies. Testing may begin immediately and continues for sixty-eight (68) days. Outgoing transactions are analyzed during the testing days, and the true positive rate is fifty-seven percent (57%), and the false positive rate is on average 0.1 false positives per user per week. Accordingly, known malicious payload fingerprints is a good indicator. The true positive rate is low, but for those identified, the indication is good since the false positive rate is very low. Further, there is no learning period. Therefore, this indicator may be given a high value (e.g., 35 points).

The tenth row of the table provides exemplary information for identifying certificates issued by low or no-cost issuers. No learning is needed, so testing may begin immediately and continues for sixty-eight (68) days. Outgoing transactions are analyzed during the testing days, and the true positive rate is five percent (5%), and the false positive rate is on average 44.4 false positives per user per week. Accordingly, certificate issuer is a poor indicator. The true positive rate is low, and the false positive rate is high. Therefore, this indicator may be given a low value (e.g., 5 points).

FIG. 6 illustrates an exemplary graph 600 indicating a rate of healing for a user confidence score. A user who has indications of infection but that is not actually infected with malleable C2 may have a reduced score, but the score should heal over time. Given a user confidence score of zero (0) to one thousand (1000), bands of scores may be associated with the health of the user confidence score, indicating how risky the user is. A poor score may be between 0-350, a moderate score may be between 351-650, and a good score may be between 651-1000. If a user repeatedly generates low severity anomalies, their score should not be severely impacted, so over time the user score heals, but it may level off if they continue to have low severity anomalies that counteract the daily healing. A model for healing may transfer a percentage of the risk from one day to the next (e.g., eighty-five percent (85%)). Using a healing model, a user having a user confidence score of 0 at day 0 heals over a three-week period (21 days) to a near perfect score of 1000 if no additional anomalies are detected during that time period. For example, on day 5, the user's score is approximately 400, which has moved from the poor score range to the moderate score range. And on day 9, the user's score is approximately 700, which has moved from the moderate score range to the good score range. A healing model can be used to counteract decay over time from minor (i.e., low severity) or repeated anomalies. Note that in some embodiments, the user confidence score can be reset to 1000 or some other reasonable score if, for example, the user's device is infected with malleable C2 and has been cleaned by security personnel. The security personnel may reset the user score, knowing the user device is clean, for example.

Figure 7:
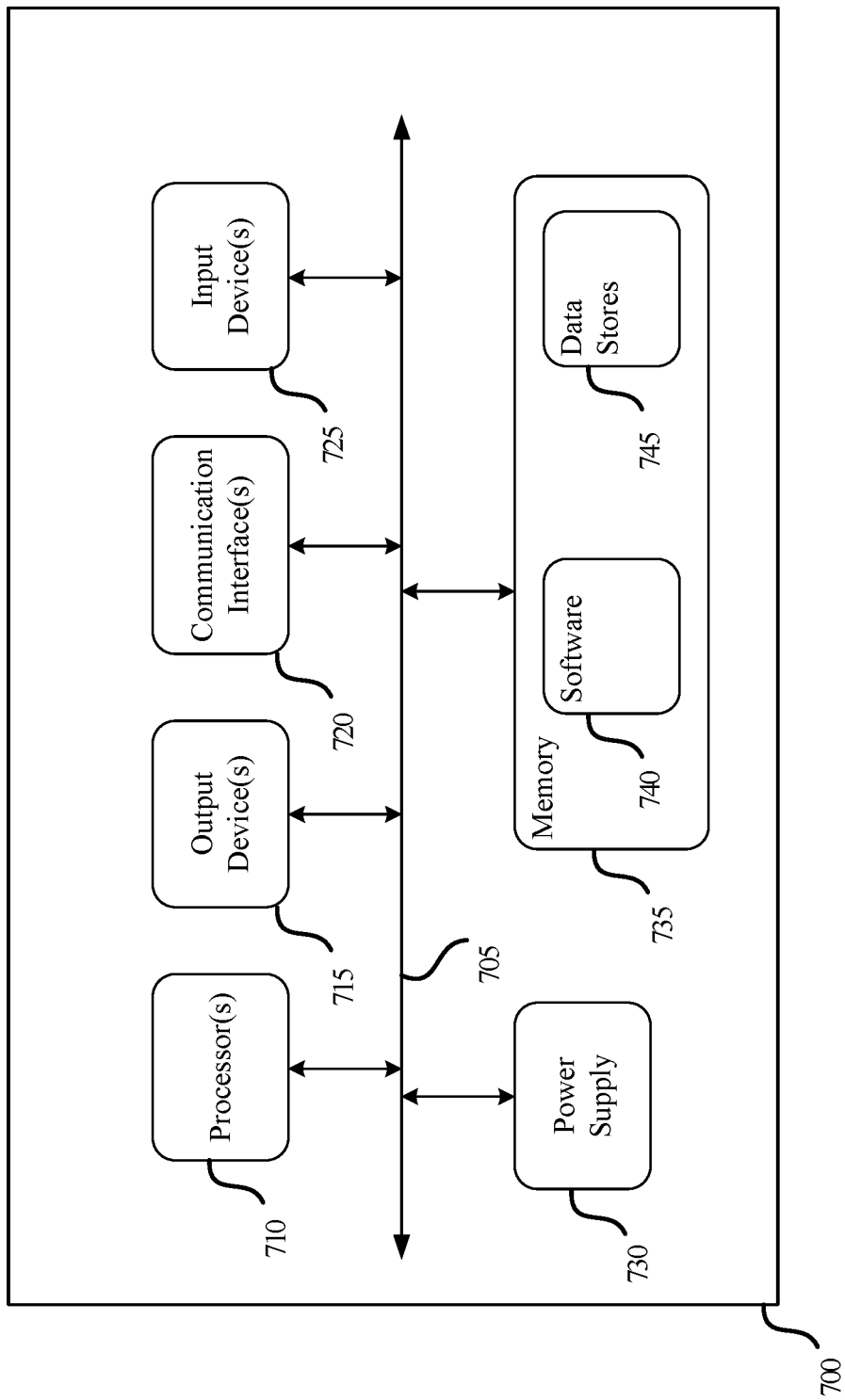
FIG. 7 illustrates an exemplary computing system, according to some embodiments.

FIG. 7 illustrates a computing device 700. The computing device 700 includes various components not included for ease of description in other computing devices discussed herein including, for example, endpoints 105, network security system 125, and destination domain servers 120. Accordingly, computing device 700 may be endpoints 105, network security system 125, or destination domain servers 120 by incorporating the functionality described in each.

Computing device 700 is suitable for implementing processing operations described herein related to security enforcement and malleable C2 detection, with which aspects of the present disclosure may be practiced. Computing device 700 may be configured to implement processing operations of any component described herein including the user system components (e.g., endpoints 105 of FIG. 1). As such, computing device 700 may be configured as a specific purpose computing device that executes specific processing operations to solve the technical problems described herein including those pertaining to security enforcement, malleable C2 detection, and user confidence scoring. Computing device 700 may be implemented as a single apparatus, system, or device or may be implemented in a distributed manner as multiple apparatuses, systems, or devices. For example, computing device 700 may comprise one or more computing devices that execute processing for applications and/or services over a distributed network to enable execution of processing operations described herein over one or more applications or services. Computing device 700 may comprise a collection of devices executing processing for front-end applications/services, back-end applications/services, or a combination thereof. Computing device 700 includes, but is not limited to, a bus 705 communicably coupling processors 710, output devices 715, communication interfaces 720, input devices 725, power supply 730, and memory 735.

Non-limiting examples of computing device 700 include smart phones, laptops, tablets, PDAs, desktop computers, servers, blade servers, cloud servers, smart computing devices including television devices and wearable computing devices including VR devices and AR devices, e-reader devices, gaming consoles and conferencing systems, among other non-limiting examples.

Processors 710 may include general processors, specialized processors such as graphical processing units (GPUs) and digital signal processors (DSPs), or a combination. Processors 710 may load and execute software 740 from memory 735. Software 740 may include one or more software components such as destination domain filter 130, security policy enforcer 140, malleable C2 analyzer 135, endpoint routing client 110, or any combination including other software components. In some examples, computing device 700 may be connected to other computing devices (e.g., display device, audio devices, servers, mobile devices, remote devices, VR devices, AR devices, or the like) to further enable processing operations to be executed. When executed by processors 710, software 740 directs processors 710 to operate as described herein for at least the various processes, operational scenarios, and sequences discussed in the foregoing implementations. Computing device 700 may optionally include additional devices, features, or functionality not discussed for purposes of brevity. For example, software 740 may include an operating system that is executed on computing device 700. Computing device 700 may further be utilized as endpoints 105 or any of the cloud computing systems in system 100 (FIG. 1) including network security system 125 or may execute the method 400 of FIG. 4.

Referring still to FIG. 7, processors 710 may include a processor or microprocessor and other circuitry that retrieves and executes software 740 from memory 735. Processors 710 may be implemented within a single processing device but may also be distributed across multiple processing devices or sub-systems that cooperate in executing program instructions. Examples of processors 710 include general purpose central processing units, microprocessors, graphical processing units, application specific processors, sound cards, speakers and logic devices, gaming devices, VR devices, AR devices as well as any other type of processing devices, combinations, or variations thereof.

Memory 735 may include any computer-readable storage device readable by processors 710 and capable of storing software 740 and data stores 745. Data stores 745 may include data store 250. Memory 735 may include volatile and nonvolatile, removable and non-removable media implemented in any method or technology for storage of information, such as computer readable instructions, data structures, program modules, cache memory, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or other suitable storage media, except for propagated signals. In no case is the computer-readable storage device a propagated signal.

In addition to computer-readable storage devices, in some implementations, memory 735 may also include computer-readable communication media over which at least some of software 740 may be communicated internally or externally. Memory 735 may be implemented as a single storage device but may also be implemented across multiple storage devices or sub-systems co-located or distributed relative to each other. Memory 735 may include additional elements, such as a controller, capable of communicating with processors 710 or possibly other systems.

Software 740 may be implemented in program instructions and among other functions may, when executed by processors 710, direct processors 710 to operate as described with respect to the various operational scenarios, sequences, and processes illustrated herein. For example, software 740 may include program instructions for executing malleable C2 analysis or security policy enforcement as described herein.

In particular, the program instructions may include various components or modules that cooperate or otherwise interact to conduct the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 740 may include additional processes, programs, or components, such as operating system software, virtual machine software, or other application software. Software 740 may also include firmware or some other form of machine-readable processing instructions executable by processors 710.

In general, software 740 may, when loaded into processors 710 and executed, transform a suitable apparatus, system, or device (of which computing device 700 is representative) overall from a general-purpose computing system into a special-purpose computing system customized to execute specific processing components described herein as well as process data and respond to queries. Indeed, encoding software 740 on memory 735 may transform the physical structure of memory 735. The specific transformation of the physical structure may depend on various factors in different implementations of this description. Examples of such factors may include, but are not limited to, the technology used to implement the storage media of memory 735 and whether the computer-storage media are characterized as primary or secondary storage, as well as other factors.

For example, if the computer readable storage device are implemented as semiconductor-based memory, software 740 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interfaces 720 may include communication connections and devices that allow for communication with other computing systems (not shown) over communication networks (not shown). Communication interfaces 720 may also be utilized to cover interfacing between processing components described herein. Examples of connections and devices that together allow for inter-system communication may include network interface cards or devices, antennas, satellites, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

Communication interfaces 720 may also include associated user interface software executable by processors 710 in support of the various user input and output devices discussed below. Separately or in conjunction with each other and other hardware and software elements, the user interface software and user interface devices may support a graphical user interface, a natural user interface, or any other type of user interface, for example, that enables front-end processing and including rendering of user interfaces, such as a user interface that is used by a user on endpoint 105. Exemplary applications and services may further be configured to interface with processing components of computing device 700 that enable output of other types of signals (e.g., audio output, handwritten input) in conjunction with operation of exemplary applications or services (e.g., a collaborative communication application or service, electronic meeting application or service, or the like) described herein.

Input devices 725 may include a keyboard, a mouse, a voice input device, a touch input device for receiving a touch gesture from a user, a motion input device for detecting non-touch gestures and other motions by a user, gaming accessories (e.g., controllers and/or headsets) and other comparable input devices and associated processing elements capable of receiving user input from a user. Output devices 715 may include a display, speakers, haptic devices, and the like. In some cases, the input and output devices may be combined in a single device, such as a display capable of displaying images and receiving touch gestures. The aforementioned user input and output devices are well known in the art and need not be discussed at length here.

Communication between computing device 700 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses, computing backplanes, or any other type of network, combination of network, or variation thereof. The aforementioned communication networks and protocols are well known and need not be discussed at length here. However, some communication protocols that may be used include, but are not limited to, the Internet protocol (IP, IPv4, IPv6, etc.), the transfer control protocol (TCP), and the user datagram protocol (UDP), as well as any other suitable communication protocol, variation, or combination thereof.

The computing device 700 has a power supply 730, which may be implemented as one or more batteries. The power supply 730 may further include an external power source, such as an AC adapter or a powered docking cradle that supplements or recharges the batteries. In some embodiments, the power supply 730 may not include batteries and the power source may be an external power source such as an AC adapter.

The aforementioned discussion is presented to enable any person skilled in the art to make and use the technology disclosed and is provided in the context of a particular application and its requirements. Various modifications to the disclosed implementations will be readily apparent to those skilled in the art, and the general principles defined herein may be applied to other implementations and applications without departing from the spirit and scope of the technology disclosed. Thus, the technology disclosed is not intended to be limited to the implementations shown but is to be accorded the widest scope consistent with the principles and features disclosed herein.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number, respectively. The word "or" in reference to a list of two or more items covers all of the following interpretations of the word: any of the items in the list, all of the items in the list, and any combination of the items in the list.

The phrases "in some embodiments," "according to some embodiments," "in the embodiments shown," "in other embodiments," and the like generally mean the particular feature, structure, or characteristic following the phrase is included in at least one implementation of the present technology and may be included in more than one implementation. In addition, such phrases do not necessarily refer to the same embodiments or different embodiments.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel or may be performed at different times. Further any specific numbers noted herein are only examples: alternative implementations may employ differing values or ranges.

What is claimed is:

1. A computer-implemented method for detecting malleable command and control, the method comprising:
   intercepting, by a network security system, outgoing transactions from a user account, wherein the outgoing transactions comprise a header identifying a destination domain server;
   extracting, by the network security system, the destination domain server from the header of each of the outgoing transactions;
   identifying, by the network security system, a subset of the outgoing transactions based on the destination domain server, wherein the destination domain server of the subset is not a known benign server;
   analyzing, by the network security system, each outgoing transaction of the subset of the outgoing transactions, the analyzing comprising:
      analyzing a payload fingerprint of the respective outgoing transaction, analyzing a user agent identified in the header of the respective outgoing transaction, detecting whether the respective outgoing transaction indicates an anomalous pattern of communication by a user device from which the respective outgoing transaction originated, and
      calculating a danger value based at least in part on anomalies associated with the payload fingerprint, anomalies associated with the user agent, and detected anomalous patterns;
   decreasing, by the network security system, a user confidence score associated with the user account based on the danger value of each outgoing transaction of the subset of the outgoing transactions; and
   in response to the user confidence score falling below a threshold value, applying a restricted security policy to future outgoing transactions from the user account.

2. The computer-implemented method of claim 1, wherein the danger value increases based on a severity and number of the anomalies associated with the payload fingerprint, the anomalies associated with the user agent, and the detected anomalous patterns.

3. The computer-implemented method of claim 1, wherein:
   analyzing the payload fingerprint comprises determining whether the payload fingerprint is in a blacklist of payload fingerprints; and
   calculating the danger value comprises increasing the danger value based on determining the payload fingerprint is in the blacklist of payload fingerprints.

4. The computer-implemented method of claim 1, wherein:
   analyzing the payload fingerprint comprises determining whether the payload fingerprint is in a baseline list of payload fingerprints associated with the user account; and
   calculating the danger value comprises increasing the danger value based on determining the payload fingerprint is not in the baseline list of payload fingerprints.

5. The computer-implemented method of claim 1, wherein:
   analyzing each outgoing transaction further comprises analyzing a certificate of the respective outgoing transaction; and
   calculating the danger value comprises increasing the danger value based on determining the certificate is issued by an issuer in a blacklist of issuers.

6. The computer-implemented method of claim 1, wherein:
   analyzing each outgoing transaction further comprises determining whether the destination domain server is included in a baseline list of destination domain servers for an organization associated with the user account; and
   calculating the danger value comprises increasing the danger value based on determining the destination domain server is not included in the baseline list of destination domain servers.

7. The computer-implemented method of claim 1, wherein:
   analyzing the user agent comprises determining whether the user agent of the respective outgoing transaction is in a baseline list of user agents associated with the user account; and
   calculating the danger value comprises increasing the danger value based on determining the user agent is not in the baseline list of user agents.

8. The computer-implemented method of claim 1, wherein:
   analyzing the user agent comprises determining whether the user agent of the respective outgoing transaction is in a baseline list of user agents associated with the user account;

analyzing each outgoing transaction further comprises determining whether the destination domain server is included in a baseline list of destination domain servers for an organization associated with the user account;
detecting whether the respective outgoing transaction indicates the anomalous pattern of communication comprises detecting beaconing; and
calculating the danger value comprises:
increasing the danger value by a first amount based on detecting the beaconing;
increasing the danger value by a second amount based on detecting the beaconing and determining the destination domain server is not included in the baseline list of destination domain servers;
increasing the danger value by a third amount based on detecting the beaconing and determining the user agent is not in the baseline list of user agents;
increasing the danger value by a fourth amount based on detecting the beaconing, determining the destination domain server is not included in the baseline list of destination domain servers, and determining the user agent is not in the baseline list of user agents; and
increasing the danger value by a fifth amount based on detecting consecutive sessions of beaconing over a given time period.

9. The computer-implemented method of claim 1, wherein the restricted security policy comprises blocking future outgoing transactions from the user account.

10. The computer-implemented method of claim 1, further comprising:
increasing, by the network security system, the user confidence score gradually over a healing time period.

11. The computer-implemented method of claim 1, further comprising:
identifying a specific destination domain server as a malicious domain server based on analyzing the subset of the outgoing transactions;
adding the specific destination domain server to a blacklist of destination domain servers; and
identifying other user accounts as infected based on comparing an outgoing transaction from the other user accounts having a destination domain server in the blacklist of destination domain servers.

12. The computer-implemented method of claim 1, wherein the outgoing transactions are one of hypertext transfer protocol (HTTP) or hypertext transfer protocol secure (HTTPS) transactions.

13. The computer-implemented method of claim 1, wherein identifying the subset of the outgoing transactions comprises determining the destination domain server for each outgoing transaction of the subset of the outgoing transactions is not in a whitelist of known benign servers.

14. A network security system, comprising:
one or more processors; and
one or more memories having stored thereon instructions that, upon execution by the one or more processors, cause the one or more processors to:
intercept outgoing transactions from a user account, wherein the outgoing transactions each comprise a header identifying a destination domain server;
extract the destination domain server from the header of each of the outgoing transactions;
identify a subset of the outgoing transactions based on the destination domain server, wherein the destination domain server of the subset is not a known benign server;
analyze each outgoing transaction of the subset of the outgoing transactions, the instructions to analyze comprising further instructions that, upon execution by the one or more processors, cause the one or more processors to:
analyze a payload fingerprint of the respective outgoing transaction,
analyze a user agent identified in the header of the respective outgoing transaction,
detect whether the respective outgoing transaction indicates an anomalous pattern of communication by a user device from which the respective outgoing transaction originated, and
calculate a danger value based at least in part on anomalies associated with the payload fingerprint, anomalies associated with the user agent, and detected anomalous patterns;
decrease a user confidence score associated with the user account based on the danger value of each outgoing transaction of the subset of the outgoing transactions; and
in response to the user confidence score falling below a threshold value, apply a restricted security policy to future outgoing transactions from the user account.

15. The network security system of claim 14, wherein:
the instructions to analyze the payload fingerprint comprise further instructions that, upon execution by the one or more processors, cause the one or more processors to:
determine whether the payload fingerprint is in a blacklist of payload fingerprints; and
the instructions to calculate the danger value comprise further instructions that, upon execution by the one or more processors, cause the one or more processors to:
increase the danger value based on determining the payload fingerprint is in the blacklist of payload fingerprints.

16. The network security system of claim 14, wherein:
the instructions to analyze the payload fingerprint comprise further instructions that, upon execution by the one or more processors, cause the one or more processors to:
determine whether the payload fingerprint is in a baseline list of payload fingerprints associated with the user account; and
the instructions to calculate the danger value comprise further instructions that, upon execution by the one or more processors, cause the one or more processors to:
increase the danger value based on determining the payload fingerprint is not in the baseline list of payload fingerprints.

17. The network security system of claim 14, wherein:
the instructions to analyze each outgoing transaction comprise further instructions that, upon execution by the one or more processors, cause the one or more processors to:
analyze a certificate of the respective outgoing transaction; and
the instructions to calculate the danger value comprise further instructions that, upon execution by the one or more processors, cause the one or more processors to:
increase the danger value based on determining the certificate is issued by an issuer in a blacklist of issuers.

18. The network security system of claim 14, wherein:
the instructions to analyze each outgoing transaction comprise further instructions that, upon execution by the one or more processors, cause the one or more processors to:
  determine whether the destination domain server is included in a baseline list of destination domain servers for an organization associated with the user account; and
the instructions to calculate the danger value comprise further instructions that, upon execution by the one or more processors, cause the one or more processors to:
  increase the danger value based on determining the destination domain server is not included in the baseline list of destination domain servers.

19. The network security system of claim 14, wherein:
the instructions to analyze the user agent comprise further instructions that, upon execution by the one or more processors, cause the one or more processors to:
  determine whether the user agent of the respective outgoing transaction is in a baseline list of user agents associated with the user account; and
the instructions to calculate the danger value comprise further instructions that, upon execution by the one or more processors, cause the one or more processors to:
  increase the danger value based on determining the user agent is not in the baseline list of user agents.

20. The network security system of claim 14, wherein:
the instructions to analyze the user agent comprise further instructions that, upon execution by the one or more processors, cause the one or more processors to:
  determine whether the user agent of the respective outgoing transaction is in a baseline list of user agents associated with the user account;
the instructions to analyze each outgoing transaction comprise further instructions that, upon execution by the one or more processors, cause the one or more processors to:
  determine whether the destination domain server is included in a baseline list of destination domain servers for an organization associated with the user account;
the instructions to detect whether the respective outgoing transaction indicates the anomalous pattern of communication comprise further instructions that, upon execution by the one or more processors, cause the one or more processors to:
  detecting beaconing; and
the instructions to calculate the danger value comprise further instructions that, upon execution by the one or more processors, cause the one or more processors to:
  increase the danger value by a first amount based on detecting the beaconing;
  increase the danger value by a second amount based on detecting the beaconing and determining the destination domain server is not included in the baseline list of destination domain servers;
  increase the danger value by a third amount based on detecting the beaconing and determining the user agent is not in the baseline list of user agents;
  increase the danger value by a fourth amount based on detecting the beaconing, determining the destination domain server is not included in the baseline list of destination domain servers, and determining the user agent is not in the baseline list of user agents; and
  increase the danger value by a fifth amount based on detecting consecutive sessions of beaconing over a given time period.

21. The network security system of claim 14, wherein the instructions comprise further instructions that, upon execution by the one or more processors, cause the one or more processors to:
  increase the user confidence score gradually over a healing time period.

22. The network security system of claim 14, wherein the instructions comprise further instructions that, upon execution by the one or more processors, cause the one or more processors to:
  identify a specific destination domain server as a malicious domain server based on analyzing the subset of the outgoing transactions;
  add the specific destination domain server to a blacklist of destination domain servers; and
  identify other user accounts as infected based on comparing an outgoing transaction from the other user accounts having a destination domain server in the blacklist of destination domain servers.

23. The network security system of claim 14, wherein the instructions to identify the subset of the outgoing transactions comprise further instructions that, upon execution by the one or more processors, cause the one or more processors to:
  determine the destination domain server for each outgoing transaction of the subset of the outgoing transactions is not in a whitelist of known benign servers.

* * * * *